June 30, 1936.    W. A. SAUL    2,046,186
THERMOSTATIC CONTROL
Original Filed Nov. 5, 1932
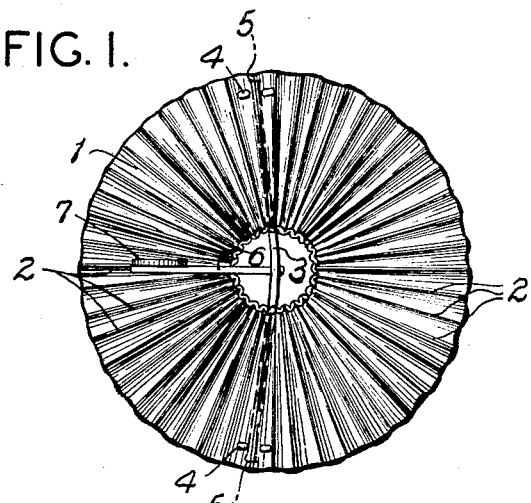
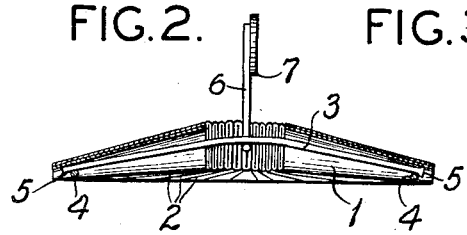 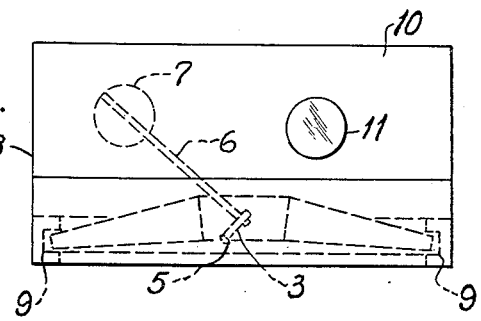
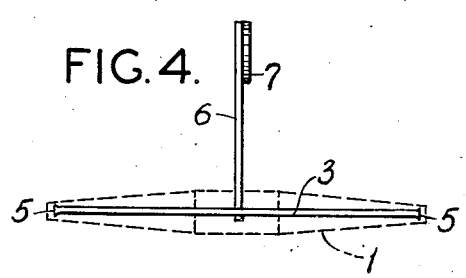 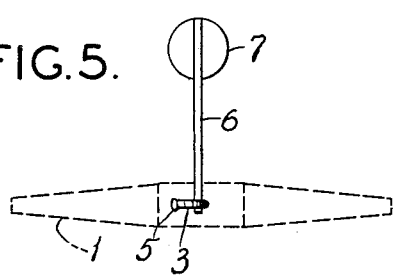
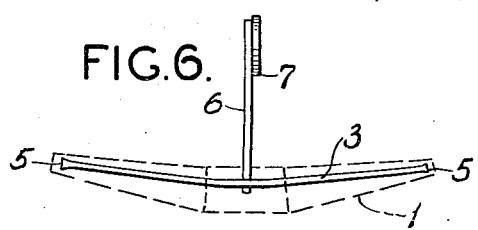 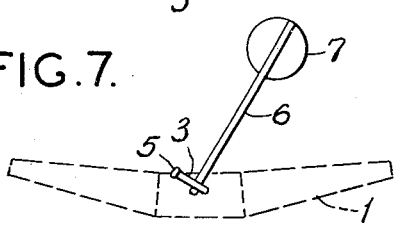

Patented June 30, 1936

2,046,186

UNITED STATES PATENT OFFICE 2,046,186

THERMOSTATIC CONTROL

Waldo A. Saul, Lexington, Mass., assignor to General Plate Company, Attleboro, Mass., a corporation of Massachusetts Application November 5, 1932, Serial No. 641,456
Renewed April 25, 1935

10 Claims. (Cl. 116—114)

This invention relates to the thermostatic controls, and with regard to certain more specific features, to thermostatic controls adapted to operate instantaneously upon the establishment of a predetermined temperature condition.

Among the several objects of the invention may be noted the provision of a thermostatic control of the type indicated which is reliable in operation and which operates through a sufficient displacement so that no danger is present that the control will be ineffectual, and which operates in an instantaneous manner immediately upon the reaching of a predetermined temperature, either as the temperature is rising or as it is falling. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which is illustrated one of various possible embodiments of the invention, Fig. 1 is a top plan view of a signal embodying the present invention;

Fig. 2 is a vertical section taken substantially along line 2—2 of Fig. 1;

Fig. 3 is a diagrammatic elevation of the signal of Fig. 1, certain elements being added;

Figs. 4 and 6 are vertical sections (partly diagrammatic) similar to Fig. 2, showing successive positionings of the signal elements; and, Figs. 5 and 7 are vertical sections (partly diagrammatic) similar to Fig. 3, showing successive positionings of the signal elements.

Similar reference characters indicate corresponding parts throughout the several views of the drawing.

In John A. Spencer Patent No. 1,895,590, dated January 31, 1933, is shown and described a thermostatic element comprising a disc of composite thermostatic metal, having radial corrugations therein. The disc is somewhat dished, or conical, so that upon temperature change, it undergoes thermal stresses which build up until they are able, with a "snap", to reverse the curvature of the disc. This reversal of curvature or direction of conicity has heretofore been used directly (as by the direct displacement of the central portion of the disc) to operate signals, electric switches, valves, and like controlled elements. In the present invention, a novel feature of the reversal of curvature is made to operate the controlled element.

Referring now more particularly to the drawing, numeral 1 indicates a composite thermostatic metal disc of the class indicated, having radial corrugations 2 completely covering the surface of the disc. As indicated in Fig. 2, the disc has an initially slightly conical form. It will be noted that the corrugations total an uneven number, so that there are no two corrugations found on a single diameter of the disc. While this feature is desirable, the corrugations may also be even in number, as will be apparent hereinafter.

Any single corrugation, it will be seen, occupies a position comparable to an element of a cone. If, now, two of these corrugations which come nearest to being on a diameter or, in case there is an even number of corrugations, any two corrugations having an angle of great obtusity therebetween, but less than 180°, are considered to determine a plane, and the evolution of said plane is followed through reversal of curvature or conicity of the disc, it will be seen that the said plane undergoes a rotation about a straight line connecting the outer extremities of the chosen corrugations. The rotation of this plane is the movement which is utilized in the present invention.

Numeral 3 indicates a preferably rigid bent or curved wire, which fits into and is held in place in the said two corrugations which come nearest to being on a diameter by means of wire loops 4 and enlarged ends 5. The wire 3, which is bent accurately to conform to the unstressed position of the corrugations chosen, is somewhat arched (see Fig. 2), but is nevertheless all in one plane (the hypothetical plane of the preceding paragraph). Extending at right angles from the wire 3, but immovably fastened thereto, is a flag-staff 6, also preferably made from rigid wire, carrying a flag or signal 7 on its end. In practical use, it is well to provide the thermostatic mechanism with an enclosing casing, such as that indicated diagrammatically at numeral 8 in Fig. 3. This casing 8 includes an annularly grooved ring 9, for mounting the periphery of the disc 1, and a box 10 including a window 11 in position to reveal the signal flag 7 when it is in the desired position.

The operation of the device has already been indicated. When the temperature rises (or falls) to a predetermined value, assuming the disc initially to be in its Figs. 1-2-3 position, it snaps to its position of opposite curvature or conicity, shown in Figs. 6 and 7, passing during the snapping through an instable central position of relative flatness, as shown in Figs. 4 and 5. Meanwhile, the wire 3 has been rotated, carrying with it the staff 6 and flag 7, the flag 7 moving through a considerable amplitude and giving the desired signal. When the temperature changes in the reverse direction past a predetermined point, the disc reverses again, returning to its initial curvature or conicity and returning the flag to its original position.

While the invention has been described in connection with a signalling motive, it will be apparent that it can also be adapted to many other forms of controls. For example, the swinging of the staff 6 might well be used to make and break electrical contacts, the device then constituting a thermostatically controlled electric switch. Or, the staff 6 may be used to control the position of a valve. It should be remembered, however, that no great amount of force is present in the swinging of the staff 6, on account of the rather delicate construction employed.

This invention is claimed in its broader aspects in my copending application, Serial No. 740,878, filed August 22, 1934.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

1. A thermostatic control comprising a radially corrugated, composite thermostatic metal disc adapted to snap from one position to another upon temperature variation, means secured to and conforming to the shape of two of the corrugations which make an angle of great obtusity, and means controlled as to position by said first-named means.

2. A thermostatic control comprising a radially corrugated, composite thermostatic metal disc adapted to snap from one position to another upon temperature variation, a relatively rigid, arched wire operatively connected to said disc and positioned in two of the corrugations nearly approximating a diameter of the disc, and means controlled as to position by said wire.

3. A thermostatic control comprising a radially corrugated, composite thermostatic metal disc adapted to snap from one position to another upon temperature variation, a relatively rigid, arched wire operatively connected to said disc and positioned in two of the corrugations nearly approximating a diameter of the disc, and a second relatively rigid wire secured at right angles to said first-named wire.

4. A thermostatic control comprising a radially corrugated, composite thermostatic metal disc adapted to snap from one position to another upon temperature variation, a relatively rigid, arched wire operatively connected to said disc and positioned in two of the corrugations nearly approximating a diameter of the disc, and a second relatively rigid wire secured at right angles to said first-named wire, said second-named wire carrying a signal flag on the free end thereof.

5. A thermostatic control comprising a radially corrugated, composite thermostatic metal disc adapted to snap from one position to another upon temperature variation, said disc being slightly conical, means occupying the position of two elements of said cone, said elements being such as make an angle of nearly 180° with each other, and means controlled as to position by said first-named means.

6. A thermostatic control comprising a radially corrugated, composite thermostatic metal disc adapted to snap from one position to another upon temperature variation, said disc being slightly conical, means occupying the position of two elements of said cone, said elements being such as make an angle of nearly 180° with each other, and means controlled as to position by said first-named means, said last-named means comprising a signal.

7. A thermostatic control comprising a radially corrugated, composite thermostatic metal disc adapted to snap from one position to another upon temperature variation, said disc being slightly conical, means occupying the position of two elements of said cone, said elements being such as make an angle of nearly 180° with each other, and means controlled as to position by said first-named means, said last-named means comprising a signal, and housing means including a window arranged to reveal said signal in one position thereof.

8. A thermostatic control comprising a radially corrugated, composite thermostatic metal disc, said disc being slightly conical whereby it is adapted to snap from one position to another upon temperature variation, and control-effecting means determined as to position by the rearrangement of relative position of selected individual corrugations incident to said snap.

9. A thermostatic control comprising a radially corrugated, composite thermostatic metal disc, said disc being slightly conical whereby it is adapted to snap from one position to another upon temperature variation, and control-effecting means positioned in a plane determined by two selected corrugations occupying positions approximating, but not quite equalling, diametrical relationship with respect to the disc as a whole.

10. A control comprising a radially corrugated, conical thermostatic disc, and a curved element articulated thereto in such manner that change of conicity of said thermostat is translated into a rotational movement of said element in a plane at an angle to the plane of movement of said thermostat.

WALDO A. SAUL.